United States Patent
Gui et al.

(10) Patent No.: US 6,824,836 B1
(45) Date of Patent: Nov. 30, 2004

(54) PROTECTION OVERCOAT FOR RECORDING MEDIA

(75) Inventors: Jing Gui, Fremont, CA (US); Michael Stirniman, Fremont, CA (US); Xiaoding Ma, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 40 days.

(21) Appl. No.: 10/624,488

(22) Filed: Jul. 23, 2003

Related U.S. Application Data (63) Continuation of application No. 09/987,570, filed on Nov. 15, 2001, now Pat. No. 6,638,608.
(60) Provisional application No. 60/279,359, filed on Mar. 27, 2001, and provisional application No. 60/276,765, filed on Mar. 16, 2001.

(51) Int. Cl.[7] .............................. G11B 5/72; C23C 14/00
(52) U.S. Cl. ........................ 427/577; 427/580; 427/122; 427/131; 427/249.7; 427/569; 427/902; 204/192.38; 204/298.41; 204/192.16
(58) Field of Search ................................. 427/527, 580, 427/122, 131, 249.7, 569, 902; 204/192.38, 298.41, 192.16

(56) References Cited

U.S. PATENT DOCUMENTS

| | | |
|---|---|---|
| 5,364,690 A | 11/1994 | Takahashi et al. |
| 5,543,203 A | 8/1996 | Tani et al. |
| 5,569,506 A | 10/1996 | Jahnes et al. |
| 5,773,124 A | 6/1998 | Ishikawa et al. |
| 5,858,182 A | 1/1999 | Horng et al. |
| 5,858,477 A | 1/1999 | Veerasamy et al. |
| 5,958,542 A | 9/1999 | Ootake et al. |
| 6,086,730 A | 7/2000 | Liu et al. |
| 6,086,796 A | 7/2000 | Brown et al. |
| 6,177,150 B1 | 1/2001 | Fujita et al. |

FOREIGN PATENT DOCUMENTS

JP      1-263917      10/1989

OTHER PUBLICATIONS

Savvides et al, Diamondlike amorphous carbon films prepared by magnetron sputtering of graphite, Nov./Dec. 1985, J. Vac. Sci. Technol A 3(6), p.p. 2386–2390.

Tamor et al, Raman, "fingerprinting" of amorphous carbon films, Sep. 15, 1994, J. Appl. Phys. 76(6), p.p. 3823–3830.

*Primary Examiner*—Stevan A. Resan
(74) *Attorney, Agent, or Firm*—Morrison & Foerster LLP (57) ABSTRACT

A magnetic recording medium comprising a magnetic layer and a protective carbon-containing overcoat comprising a first carbon density, preferably of a low-density carbon, and a second carbon density different from the first carbon density, preferably of a high-density carbon, and a method of making and using the magnetic recording medium are disclosed.

10 Claims, 9 Drawing Sheets

← Lubricant 24

← Overcoat 23

← Magnetic Layer 22

← Underlayer 21

← Substrate 20

← Underlayer 21'

← Magnetic Layer 22'

← Overcoat 23'

← Lubricant 24'

High E PECVD carbon layer

Sputter C layer

Magnetic layer

PROTECTION OVERCOAT FOR RECORDING MEDIA

RELATED APPLICATIONS

This divisional application claims priority from parent Application Ser. No. 09/987,570, filed Nov. 15, 2001, now U.S. Pat. No. 6,638,608 which claims priority from Provisional Application Ser. No. 60/276,765, filed Mar. 16, 2001, entitled "Overcoat Design and Manufacturing Method for Magnetic Recording Media," and Provisional Application Ser. No. 60/279,359, filed Mar. 27, 2001, entitled "Magnetic Recording Media with Dual-Layer Carbon Overcoat," the entire disclosures of which are incorporated herein by reference.

FIELD OF THE INVENTION

The present invention relates to recording medium with a carbon-containing overcoat, particularly, a carbon-containing overcoat with a variable carbon density, and a method of making the same.

BACKGROUND

Most modern information storage systems depend on magnetic recording due to its reliability, low cost, and high storage capacity. The primary elements of a magnetic recording system are the magnetic recording medium, and the read/write head. Magnetic discs with magnetizable media are used for data storage in almost all computer systems.

Figure 1:
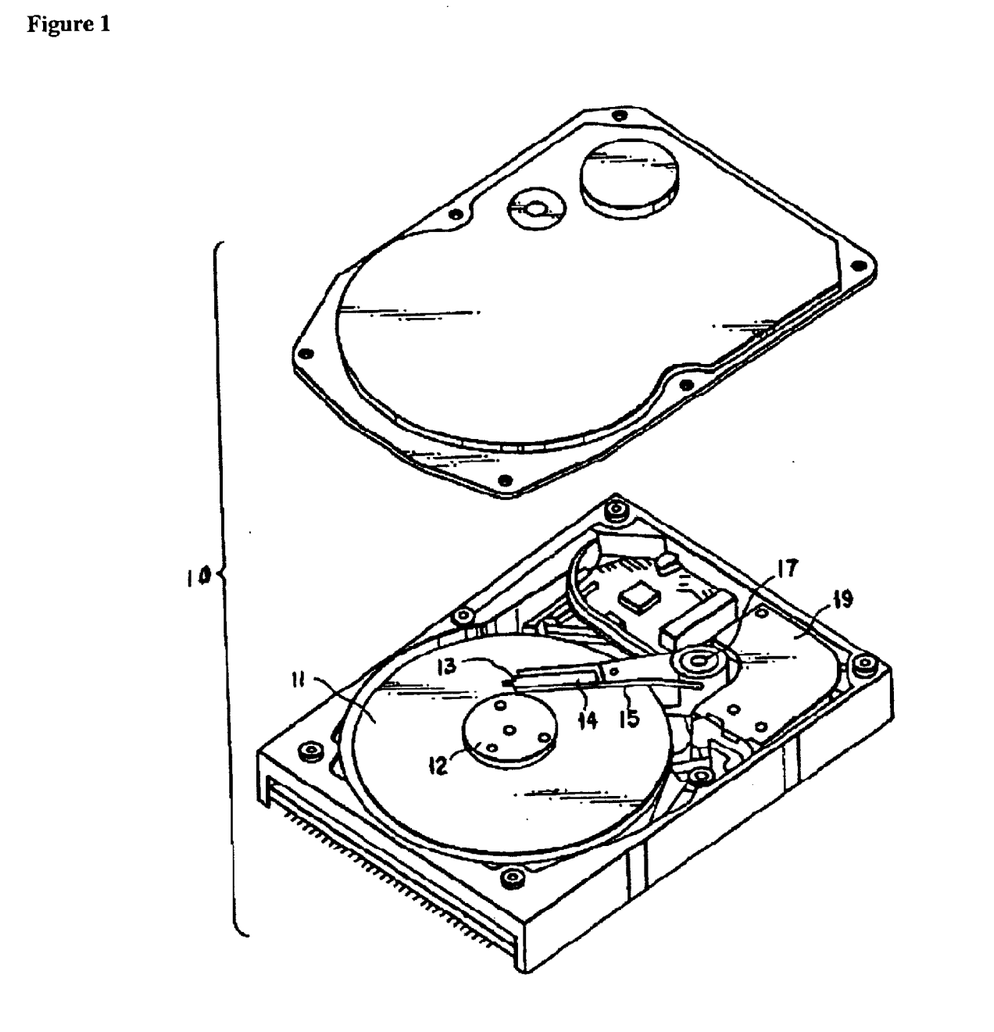
FIG. 1 is a view of a magnetic disc drive.

FIG. 1 shows the schematic arrangement of a magnetic disc drive 10 using a rotary actuator. A disc or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disc 11. The rotary actuator could have several suspensions and multiple magnetic heads to allow for simultaneous recording and reproduction on and from both surfaces of each medium. A voice coil motor 19 as a kind of linear motor is provided to the other end of the arm 15. The arm 15 is swingably supported by ball bearings (not shown) provided at the upper and lower portions of a pivot portion 17.

Figure 2:
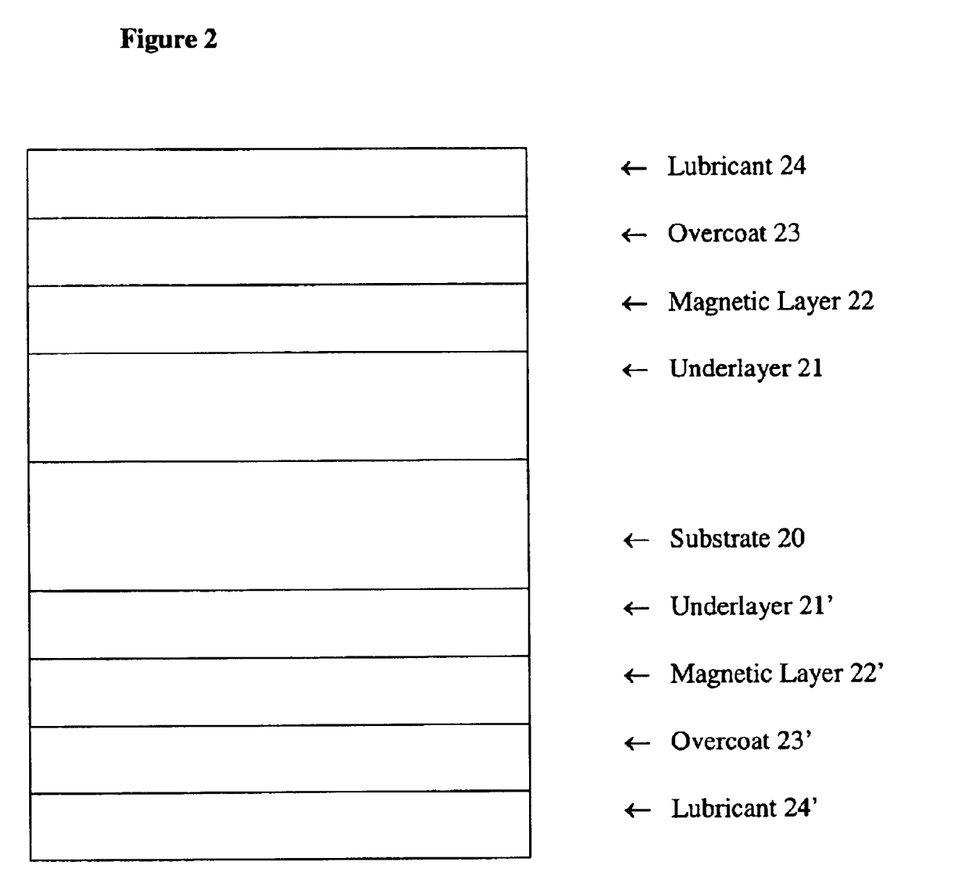
FIG. 2 schematically shows a conventional magnetic recording medium (Prior Art).

A conventional longitudinal recording disc medium is depicted in FIG. 2 and typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat 24, 24' to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

A conventional longitudinal recording disc medium is prepared by depositing multiple layers of metal films to make a composite film. In sequential order, the multiple layers typically comprise a non-magnetic substrate, a seedlayer, one or more underlayers, a magnetic layer, and a protective carbon layer. Generally, a polycrystalline epitaxially grown cobalt-chromium (COCr) magnetic layer is deposited on a chromium or chromium-alloy underlayer.

The seed layer, underlayer, and magnetic layer are conventionally sequentially sputter deposited on the substrate in an inert gas atmosphere, such as an atmosphere of pure argon. A conventional carbon-containing overcoat is typically deposited in argon with nitrogen, hydrogen or ethylene. Conventional lubricant topcoats are typically about 20 Å thick.

There is a demand in computer hard drive industry to develop recording media with high areal storage density. However, an increase in high areal density often demands that the flying height between the read-write head and the recording media have to be minimized. Current magnetic hard disc drives operate with the read-write heads only a few nanometers above the disc surface and at rather high speeds, typically a few meters per second. Because the read-write heads can contact the disc surface during operation, a protective overcoat is applied to the disc surface to protect the recording media from inadvertent collisions with the recording head. The protective overcoat also protects the recording media from environmental stresses, e.g., moisture or corrosive environments.

As hard disc drive technology is pushed to higher and higher recording densities, the industry is faced with an increasingly difficult task of maintaining the tribological robustness of the head-disc interface (HDI). The durability and reliability of recording media is achieved primarily by the application of two protective layers: carbon-containing overcoat and liquid lubricant film. Diamond-like carbon (DLC) has been used as a protective layer for magnetic recording media. Conventionally, DC or RF magnetron sputtering could be used to deposit a thin layer of DLC on disks.

Manufacturers have used sputtered amorphous carbon-containing overcoats to provide protective coatings for recording medium. U.S. Pat. No. 5,462,784 discloses using a thick fluorinated diamond-like carbon layer of thickness in the range between 30 Å and 300 Å. U.S. Pat. No. 5,182,132 discloses a diamond-like carbon layer deposited by plasma enhanced chemical vapor deposition (PECVD). European Patent Application No. 595,564 discloses a diamond-like carbon layer containing carbon and hydrogen.

Most disc drives produced currently operate in the Contact Start/Stop (CSS) mode. Since the recording head contacts with recording media during takeoff and landing, corrosion of the magnetic layer due to a large number of CSS cycles could be a major cause of drive failure. To ensure good corrosion resistance, applicants have found that an overcoat having the ability to prevent corrosion of the magnetic layer is required and a traditional overcoat material, such as hydrogenated (a-C:H) or nitrogenated (a-C:N) carbon, could be insufficient in protecting the hard disc media or read-write head from corrosion at the thickness level of less than 5nm.

With the continuous increase of the recording density, the carbon-containing overcoat becomes thinner and thinner, even less than 3nm, at which thickness applicants have found that the conventional sputtered carbon may not be satisfactory as a protective overcoat. To improve the mechanical properties of the carbon-containing overcoat, thinner and harder films, such as plasma enhanced chemical vapor deposition (PECVD), ion beam deposition (IBD), and filtered cathodic arc deposition (FCA) were tried. These techniques deposit a carbon-containing overcoat by employing high carbon ion energy of more than 50 eV, typically, more than 50 to about 150 eV. These techniques could produce a hard and dense carbon film due to the much higher carbon ion energy (50–150 eV) used in the process of sputtering the carbon-containing overcoat.

Figure 3:
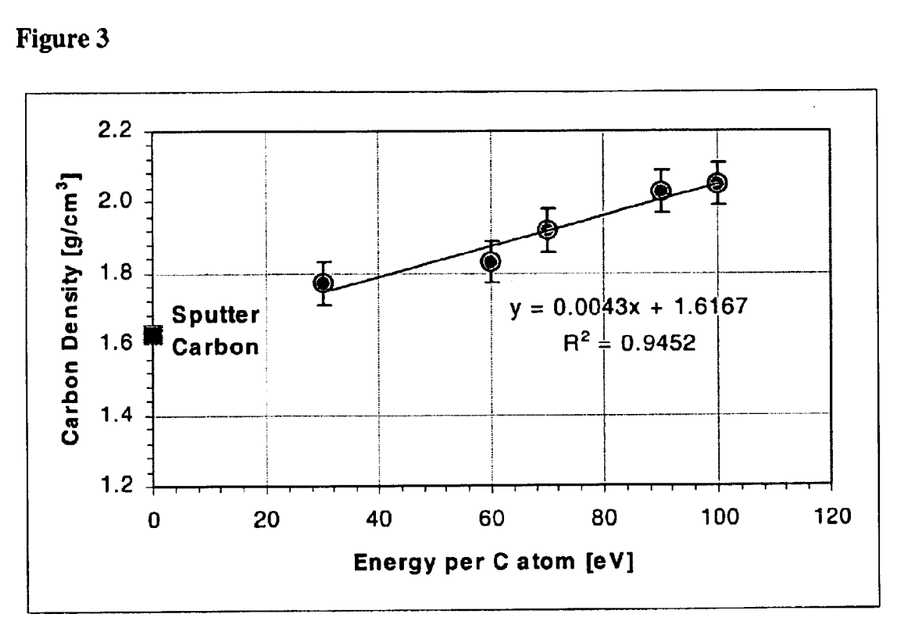
FIG. 3 shows carbon film density as a function of energy per carbon atom.

FIG. 3 shows that the higher the carbon atom energy, the greater is the density of the carbon-containing overcoat. However, the impingement of the energetic carbon ions onto the magnetic layer can cause the mixing of carbon with the magnetic material at the interface of the magnetic layer.

Therefore, there still exists a need for a thin overcoat for a magnetic recording medium that has good corrosion resistance and tribological performance while minimizing the interfacial mixing of carbon and magnetic elements in the magnetic layer of the magnetic recording medium.

SUMMARY OF THE INVENTION

An embodiment of this invention is a magnetic recording medium comprising a substrate; a magnetic layer; and a carbon-containing overcoat having a thickness of about 150 Å or less and comprising a first carbon density and a second carbon density different from the first carbon density, wherein the magnetic recording medium does not contain a dielectric layer between the magnetic layer and the carbon-containing overcoat, and preferably, the carbon-containing overcoat directly contacts the magnetic layer. The first carbon density is about 1.8 g/cm$^3$ or less, the second carbon density is higher than the first carbon density and the difference between the second carbon density and the first carbon density is at least about 0.025 g/cm$^3$.

In other embodiments, the first carbon density is a density selected from the group consisting of about 1.75 g/cm$^3$ or less, 1.7 g/cm$^3$ or less, 1.65 g/cm$^3$ or less and 1.6 g/cm$^3$ or less; the second carbon density is a density selected from the group consisting of at least 1.8 g/cm$^3$, of at least 1.85 g/cm$^3$, of at least 1.9 g/cm$^3$ and of at least 1.95 g/cm$^3$; and the first carbon density is at a distance of 30 Å or less from a top surface of the magnetic layer.

In some embodiments, the carbon-containing overcoat comprises a material selected from a group consisting of carbon, hydrogenated carbon, fluorinated carbon, nitrated carbon, amorphous carbon, amorphous hydrogenated carbon, amorphous fluorinated carbon, amorphous nitrated carbon and combinations thereof. The carbon-containing overcoat could comprise at least a first carbon layer and a second carbon layer, wherein the first carbon layer could be deposited using a sputtering process and is closer to the magnetic layer and comprises the first carbon density. Preferably, the second carbon layer comprises the second carbon density, the second density is at least 1.8 g/cm$^3$.

Another embodiment of this invention is a method of making a magnetic recording medium comprising depositing a magnetic layer on a substrate; depositing a first portion of a carbon-containing overcoat directly on the magnetic layer; and depositing second portion of the carbon-containing overcoat under the following deposition condition:

$$Y \geq 0.7764 \, X^{0.5639}$$

wherein, Y is a thickness of the first portion of the carbon-containing overcoat and X is carbon ion energy per carbon atom in eV during said depositing second portion of the carbon-containing overcoat and the carbon-containing overcoat comprises a first carbon density and a second carbon density different from the first carbon density. The step of depositing a carbon-containing overcoat could comprise increasing the carbon ion energy as the thickness of the carbon-containing overcoat is increased.

In a preferred embodiment, the carbon-containing overcoat has a thickness of about 150 Å or less on the magnetic layer and the first carbon density is about 1.8 g/cm$^3$ or less. In a particular embodiment, the carbon ion energy is increased from a first range of less than 50 eV to a second range of more than 50 eV during said depositing a carbon-containing overcoat.

The first carbon layer could be deposited using a deposition process selected from the group consisting of plasma-enhanced chemical vapor deposition, ion beam deposition, and filtered cathodic art deposition.

Another embodiment of this invention is a magnetic recording medium, comprising a magnetic layer and means for protecting the magnetic layer.

In this invention, "means for protecting the magnetic layer" refers to a carbon-containing overcoat of a thickness of about 150 Å or less directly on the magnetic layer without another layer that is neither a carbon-containing layer or a magnetic layer interposed between the carbon-containing layer and the magnetic layer, wherein the carbon-containing overcoat comprises a first carbon density of about 1.8 g/cm$^3$ or less and a second carbon density different from the first carbon density.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWING

The present invention will be better understood by reference to the Detailed Description of the Invention when taken together with the attached drawings.

DETAILED DESCRIPTION OF THE INVENTION

To minimize the carbon/magnetic layer mixing at the interface, one needs to reduce the energy of the carbon species that impinge directly upon the magnetic layer. On the other hand, to ensure good head-disk interface (HDI) performance of the overcoat one needs to increase the energy of the carbon species. To simultaneously satisfy these two seemingly contradictory requirements, applicants have found that one could employ different overcoat designs and deposition technique.

During the conventional sputter process, the energy of carbon species is very low (<5 eV) as shown in FIG. 3. Therefore the Co/C interface mixing is minimum. However, the impingement of the energetic ions onto the magnetic layer can cause the mixing of carbon with magnetic layer at the interface and cause degradation of the magnetic layer. This degradation effect is shown in FIG. 4.

Figure 4:
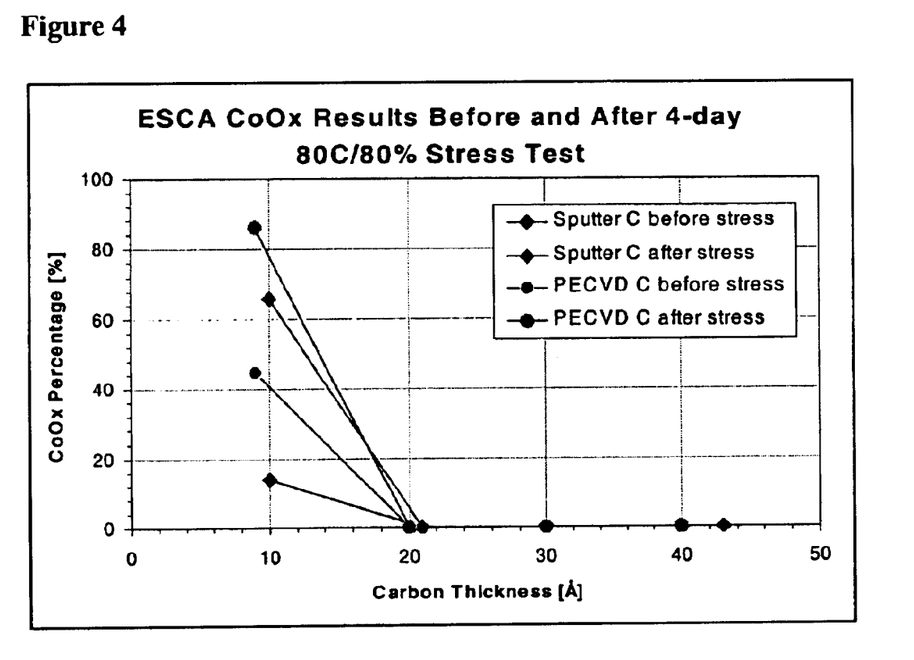
FIG. 4 shows CoOx percentage on carbon surfaces measured by ESCA.

FIG. 4 shows the Co oxides percentage measured by ESCA on the carbon surfaces before and after 4-day stress test (i.e., accelerated corrosion test) done at 80° C. and 80% relative humidity. In this stress test, disks were placed in an environmental chamber and exposed to 80° C. and 80% relative humidity for 4 days to accelerate Co oxidation.

When the carbon overcoat is not sufficiently protective, a substantial amount (>5%) of Co oxide will be detected by ESCA measurement after the test. FIG. 4 shows that when the carbon thickness is more than 20 Å, the percentage of Co oxides after the stress test is less than 5% for both sputtered carbon and PECVD carbon. However, when the carbon thickness is reduced to 10 Å, there is a higher CoOx percentage on PECVD carbon than sputtered carbon.

Figure 5:
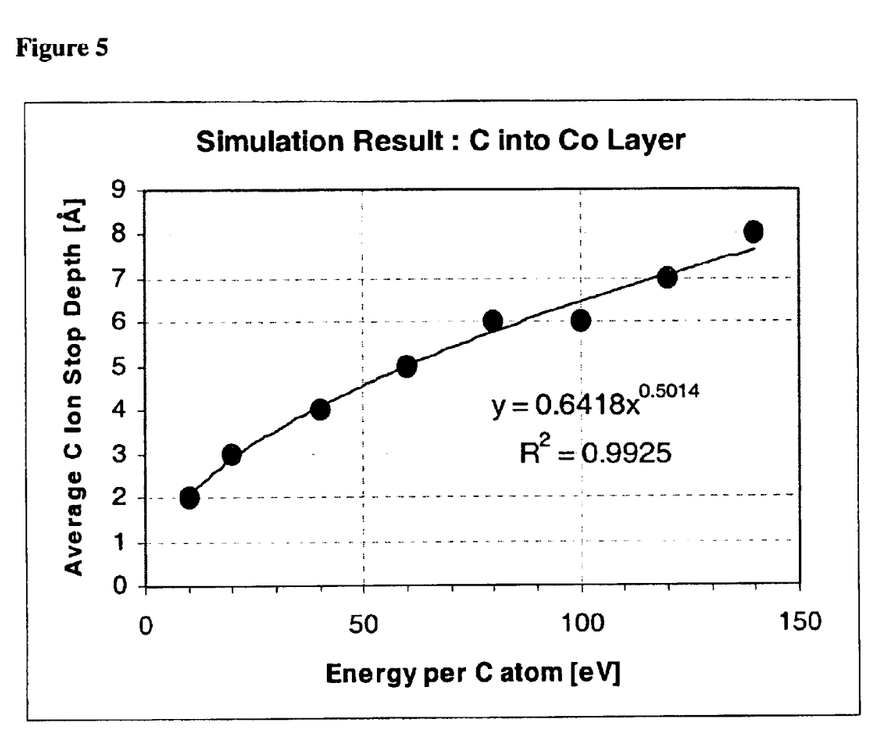
FIG. 5 shows average C ion stop depth inside a Co layer vs. energy per C atom.

Applicants also simulated the stop range of the carbon ion with the energy from 20 to 140 eV into Co film. As shown by the simulation results in FIG. 5, carbon ions with 50–100 eV incident energy can penetrate 5–10 Å into a Co film. Such interface mixing has at least two undesirable effects: degradation of magnetic performance due to carbon inside the magnetic layer and deterioration of the corrosion resistance of the media due to appreciable Co concentration inside the carbon-containing overcoat.

EXAMPLES

Figure 6:
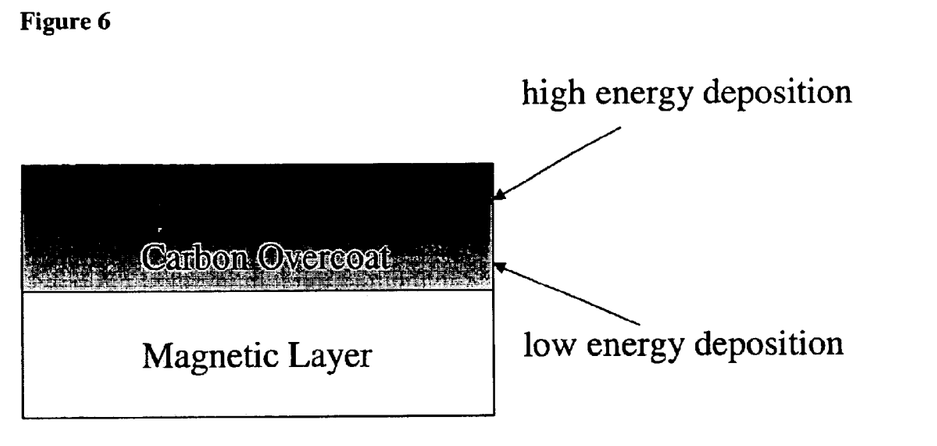
FIG. 6 shows an embodiment of this invention.

An embodiment of a recording disk medium of this invention is depicted in FIG. 6, which comprises a magnetic layer on a non-magnetic substrate (not shown) and a carbon-containing overcoat on the magnetic layer. The design of FIG. 6 is such that the density of the carbon-containing overcoat varies from relatively low, i.e., less than 1.8 g/cm$^3$, at the carbon/magnetic alloy interface to relatively high, 1.8 g/cm$^3$ or more, at the surface of the overcoat. This design is shown in FIG. 6 by the increased shading density with increasing carbon density.

The bottom portion of the carbon-containing overcoat provides a buffer for substantially preventing carbon ion penetration into the magnetic layer when depositing the subsequently deposited top portion of the carbon-containing overcoat by a high energy carbon ion deposition technique. The top portion comprises a high-density carbon-containing film that affords superior tribological and corrosion performance. This overcoat design can be achieved by varying the carbon energy during deposition, namely, by adjusting the energy from low in the beginning of the carbon deposition to high at the end of the carbon deposition. In one embodiment, the locations of the bottom and top portions are from about 1 Å to 7 Å and from about 8 Å to 30 Å from the top surface of the magnetic layer.

Figure 7:
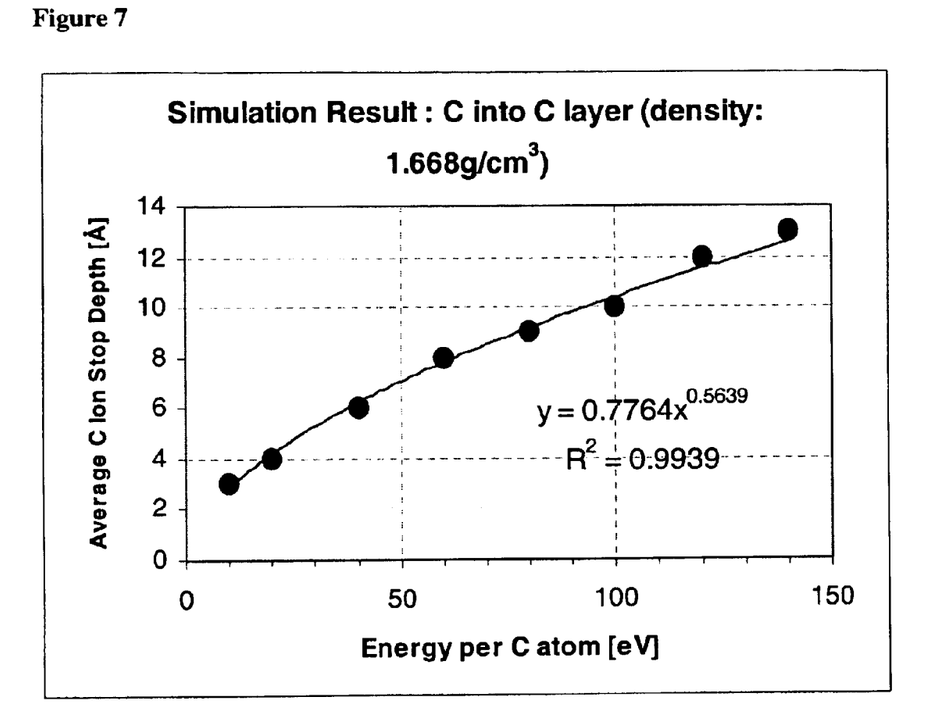
FIG. 7 shows average C ion stop depth inside a carbon layer vs. energy per C atom.

According to the embodiment of FIG. 6, after a layer of low energy carbon is deposited, the subsequent carbon deposition at high energy will not substantially cause any significant interface mixing because most of the high energy carbon species will be stopped by the existing carbon layer, as shown in FIG. 7. FIG. 7 shows that once the carbon layer on the magnetic layer is of a thickness of at least 1.5 nm, subsequently deposited carbon atoms on the carbon layer could be deposited using a carbon ion energy of up 150 eV and yet there would be a minimal penetration of the subsequently deposited carbon atoms into the magnetic layer.

According to this invention, for example, as shown in FIG. 7, the magnetic layer is substantially free of carbon when (a) the carbon-containing overcoat shows less than 5 change in the oxide content of the magnetic material of the magnetic layer as measured by ESCA on the carbon surfaces before and after 4-day stress test done at 80° C. and 80% relative humidity, (b) the carbon-containing overcoat is deposited with carbon ion energy per carbon atom of 50 eV or less, or (c) the carbon-containing overcoat is deposited under the following deposition condition:

$$Y \geq 0.7764 \, X^{0.5639} \text{ when X is greater than 50 eV}$$

wherein, Y is a thickness of the carbon-containing overcoat and X is carbon ion energy per carbon atom in eV.

Figure 8:
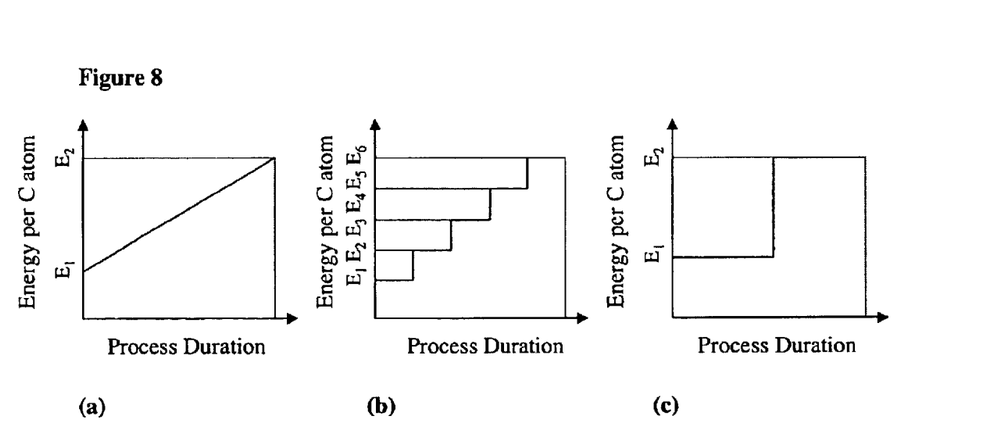
FIGS. 8a, 8b and 8c show different deposition schemes to produce the carbon-containing overcoat of this invention.

FIGS. 8a, 8b and 8c show different deposition schemes to produce the carbon-containing overcoat of the embodiment of FIG. 6. FIG. 8a shows that one scheme is to start the carbon deposition with a low carbon energy $E_1$, which is most likely less than 20 eV/C, and then continuously increase the energy to $E_2$ (>E1), which is most likely greater than 30 eV/C and preferably 50–150 eV/C. FIG. 8b shows a second scheme to produce the proposed overcoat design. Instead of steadily and linearly increasing the energy, one could increase the energy stepwise from $E_1$ to $E_2$. The number of steps can be greater than 1. FIG. 8c is yet a third scheme involving only one step. First a layer of carbon with low energy, $E_1$, is deposited and then on top of it the second layer of carbon with high energy, $E_2$, is deposited. The thickness of the $E_1$ layer is determined by the energy of the $E_2$ layer to guarantee that carbon species with $E_2$ energy do not penetrate into the magnetic layer. For example, if $E_2$ is 100 eV/C, it is preferred to make the $E_1$ layer at least 10 Å thick.

Preferably, for the first portion of the carbon-containing overcoat that is located next to the magnetic layer, the carbon ion energy could be from 1 eV to 60 eV at anytime of carbon deposition until the thickness of the first portion of the carbon-containing overcoat is of a value selected from the group consisting of less than 3 Å, less than 5 Å, less than 8 Å, and less than 12 Å. Also, preferably for the second portion of the carbon-containing overcoat that deposited on the first portion of the carbon-containing overcoat, the carbon ion energy could be from 30 eV to 300 eV at anytime of carbon deposition and the thickness of the second portion of the carbon-containing overcoat is of a value selected from the group consisting of at least 5 Å, of at least 10 Å, of at least 15 Å, and of at least 20 Å. While the first and second portions of the carbon-containing overcoat would have different carbon densities, it is not required that the first and second portions have a sharp boundary that separates the first and second portions of the carbon-containing overcoat.

Figure 9:
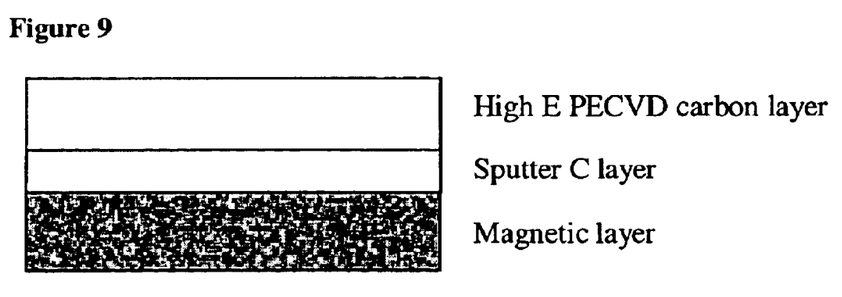
FIG. 9 shows another embodiment of this invention.

Another embodiment of this invention is shown in FIG. 9, which shows a first deposited layer of sputtered carbon on top of the magnetic layer, and then on top of the sputtered carbon layer is a deposited second layer of carbon produced using PECVD. The thickness of the first sputtered carbon layer is 3 to 15 Å, preferably 5–10 Å. The thickness of the second PECVD carbon layer ranges from 5 to 50 Å, preferably 10–15 Å. The energy per carbon atom during PECVD process is around 50 to 100 eV/C. The first sputter carbon layer can be amorphous carbon (a-C), or hydrogenated carbon (a-C:H). The second carbon layer can be hydrogenated or hybrid PECVD carbon.

In this invention, embodiments of the substrate include any substrate made of a glass or glass-ceramic, NiP/Al, metal alloys, plastic/polymer material, ceramic, glasspolymer, composite materials or other non-magnetic materials.

A seed layer and/or an underlayer, if incorporated in the magnetic recording medium of this invention between the substrate and the magnetic layer in this order on the substrate, could comprise Cr and/or C-containing material, e.g., chromium vanadium (CrV) or an alloy of Co, Cr, platinum and tantalum (CoCrPtTa). The seed layer could have a thickness of about 20 to 800 Å, preferably about 25 to 200 Å. The underlayer could have a thickness of about 10 to 500 Å, preferably about 15 to 200 Å.

Embodiments of the present invention also comprise forming an internediate layer, such as Cr or Cr-containing alloy, between the underlayer layer and magnetic layer. Suitable intermediate layer includes CrW, CoCr or Cr alloy at a thickness of 10 to 500 Å, preferably about 50 to 200 Å. Suitable magnetic layer includes a Co-containing layer, such as a CoCrPtTa alloy at a thickness of about 25 to 500 Å, preferably about 50 to 250 Å.

In addition, a lubricant could be applied to the carbon-containing overcoat of the magnetic recording medium of this invention. The most widely used class of lubricants includes perfluoropolyethers such as AM 2001®, Z-DOL®, Ausimont's Zdol or Krytox lubricants from DuPont. Other lubricants employed that could be employed in this invention include perfluoropolyethers, functionalized perfluoropolyethers, perfluoropolyalkylethers (PFPE), and functionalized PFPE.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A method of making a magnetic recording medium comprising:
   depositing a magnetic layer on a substrate;
   depositing a first portion of a carbon-containing overcoat directly on the magnetic layer, and
   depositing second portion of the carbon-containing overcoat under the following deposition condition:

$Y \geq 0.7764 \, X^{0.5639}$ wherein, Y is a thickness of the first portion of the carbon-containing overcoat and X is carbon ion energy per carbon atom in eV during said depositing second portion of the carbon-containing overcoat and
   the carbon-containing overcoat comprises a first carbon density and a second carbon density different from the first carbon density.

2. The method of claim 1, wherein said depositing a carbon-containing overcoat comprises increasing the carbon ion energy as the thickness of the carbon-containing overcoat is increased.

3. The method of claim 1, wherein the carbon-containing overcoat has a thickness of about 150 Å or less on the magnetic layer and the first carbon density is about 1.8 g/cm$^3$ or less.

4. The method of claim 1, wherein the carbon ion energy is increased from a first range of less than 50 eV to a second range of more than 50 eV during said depositing a carbon-containing overcoat.

5. The method of daim 1, wherein the first carbon density is about 1.75 g/cm$^3$ or less.

6. The method of claim 1, wherein the second carbon density is at least 1.8 g/cm$^3$ or less.

7. The method of claim 1, wherein the carbon-containing overcoat comprises at least a first carbon layer and a second carbon layer.

8. The method of claim 7, wherein the first carbon layer is closer to the magnetic layer than the second carbon and the first carbon layer is deposited using a sputtering process.

9. The method of claim 7, wherein the second carbon layer is on the first carbon layer and is deposited using a deposition process selected from the group consisting of plasma-enhanced chemical vapor deposition, ion beam deposition, and filtered cathodic art deposition.

10. The method of claim 7, wherein the first carbon layer comprises a first carbon desity and the second carbon layer comprises the second carbon density, the second carbon density being higher than the first carbon density.

* * * * *